United States Patent
Paul

(10) Patent No.: US 10,104,900 B2
(45) Date of Patent: Oct. 23, 2018

(54) COLD BREW ESPRESSO MANUFACTURING PROCESS

(71) Applicant: Candice S Paul, Cape Coral, FL (US)

(72) Inventor: Candice S Paul, Cape Coral, FL (US)

( * ) Notice: Subject to any disclaimer, the term of this patent is extended or adjusted under 35 U.S.C. 154(b) by 333 days.

(21) Appl. No.: 15/174,897

(22) Filed: Jun. 6, 2016

(65) Prior Publication Data

US 2016/0353761 A1    Dec. 8, 2016

Related U.S. Application Data

(60) Provisional application No. 62/230,382, filed on Jun. 5, 2015.

(51) Int. Cl.
 *A23F 5/26* (2006.01)
 *A47J 31/34* (2006.01)
 *A47J 31/00* (2006.01)

(52) U.S. Cl.
 CPC ............. *A23F 5/262* (2013.01); *A47J 31/002* (2013.01); *A47J 31/34* (2013.01)

(58) Field of Classification Search
 CPC .......... A23F 5/262; A47J 31/002; A47J 31/34
 See application file for complete search history.

(56) References Cited

U.S. PATENT DOCUMENTS

| | | | | |
|---|---|---|---|---|
| 3,592,126 A | * | 7/1971 | Dombrowik | A47J 31/053 210/474 |
| 4,858,522 A | * | 8/1989 | Castelli | A47J 31/3609 99/280 |
| 4,993,315 A | * | 2/1991 | Huber | A47J 31/3609 100/116 |
| 2013/0019756 A1 | * | 1/2013 | Coats | A47J 31/56 99/281 |

FOREIGN PATENT DOCUMENTS

| | | | |
|---|---|---|---|
| FR | 2791545 | * | 10/2000 |
| WO | WO 01/45538 | * | 6/2001 |

OTHER PUBLICATIONS

English Translation for FR2791545 published Oct. 2000.*
KRUVE Brew Guide. 2018. https://www.kruveinc.com/pages/recipe-series.*

* cited by examiner

*Primary Examiner* — Anthony J Weier
(74) *Attorney, Agent, or Firm* — Michael L. Greenberg, Esq.; Greenberg & Lieberman, LLC

(57) ABSTRACT

A new method and system cold brewing espresso is described. The system employs an in-line percolator filter housing and a liquid pump. After an initial brew, the pump is configured to pump the coffee through the coffee grounds within the filter housing multiple times, in order to achieve the desired flavor and caffeine intensity via cold brewing. The coffee is finely ground to approximately 80 microns to best achieve the percolated result.

3 Claims, 1 Drawing Sheet

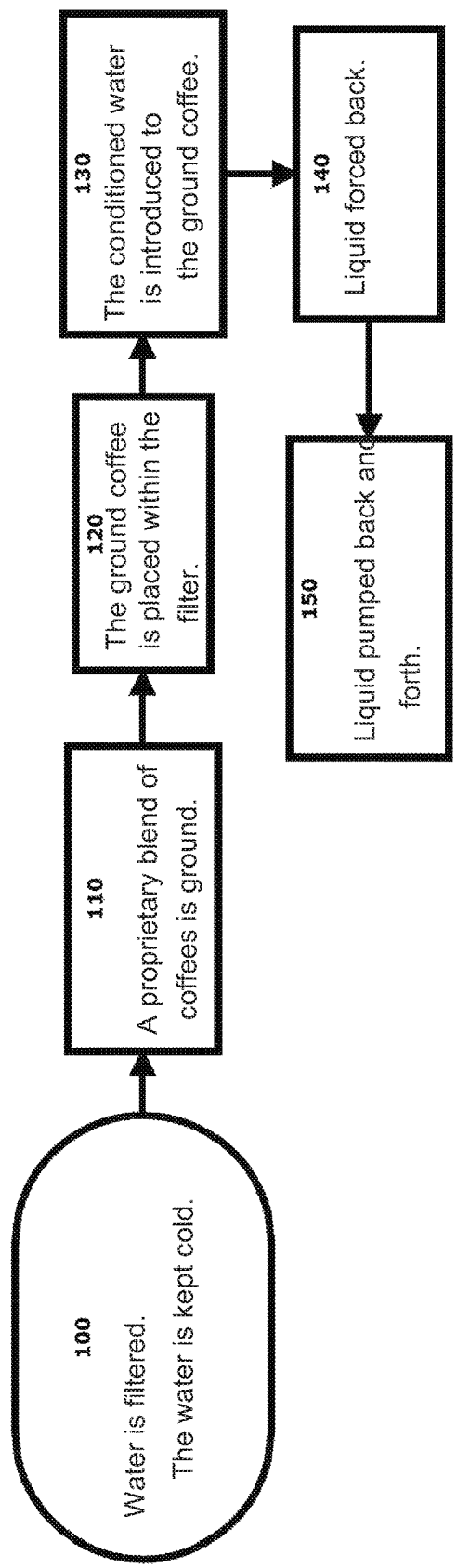

COLD BREW ESPRESSO MANUFACTURING PROCESS

CONTINUITY

This application is a non-provisional patent application of provisional patent application No. 62/230,382, filed on Jun. 5, 2015, and priority is claimed thereto.

FIELD OF THE PRESENT INVENTION

The present invention relates generally to brewing methods, and more specifically relates to a method for cold brewing espresso to achieve a low pH and high caffeine value for drinking with exceptional flavor.

BACKGROUND OF THE PRESENT INVENTION

Traditionally, the production of coffee beverages has entailed the use of heated water passed through ground, roasted coffee. Using a traditional, heated coffee process, it is very difficult to reduce or eliminate high pH values of the brew. Coffee users responded to this challenge by using only cold water to brew coffee. Presently there are two main methods of Cold Brewing coffee; Infusion and Drip. The infusion method uses ground coffee immersed in water for a period of hours. The drip method suspends coffee grounds in a filter mechanism and gravity drips water through the grounds. Additionally, some people are left wanting more flavor and caffeine without a high acid content. If there were a way to cold brew espresso, additional flavor and caffeine could be achieved in the brew.

Thus, there is a need for a new espresso cold-brewing system and method that can achieve more than the high flavor and caffeine content of conventionally brewed (hot) espresso, without the need to chill hot coffee. Such a system preferably employs a percolation technique via a pumping and controller assembly.

SUMMARY OF THE PRESENT INVENTION

The present invention relates to a new method and system of cold brewing espresso in order achieve a coffee beverage that is high in flavor, as well as high in caffeine content. The method of the present invention is similar to known cold-brewing methods in that it uses cold water and ground coffee suspended in a filter mechanism. Where the present invention departs from conventional brewing is in the mechanical percolation step. Using a pumping and controller assembly, the conditioned water is repeatedly passed through the suspended coffee grounds producing a resulting brew that is exceptionally high in caffeine, high in flavor and very low in acid. Coffee blend and grind and percolation duration have been empirically determined.

BRIEF DESCRIPTION OF THE DRAWINGS

The present invention will be better understood with reference to the appended drawing sheets, wherein:

FIG. 1 exhibits a flow chart of the process employed by the system of the present invention.

DETAILED DESCRIPTION OF THE PREFERRED EMBODIMENT

The present invention is a cold brew espresso manufacturing process for use by consumers and companies to supply fresh espresso that is low in acid and high in flavor and caffeine. The system employs a water conditioner, which uses reverse osmosis to condition and purify the water used in the brewing process. Additionally, the system of the present invention preferably uses a proprietary blend of coffees, which are 'percolator' ground. A specialized filter is employed to house the coffee grounds for brewing.

The first step of the process of use of the system of the present invention is to condition a water supply through Reverse Osmosis with the post reverse osmosis addition of selected salts and minerals to bring the water to a repeatable condition that enhances the unique flavor of the Euphoria Cold Brew Espresso. Water conditioning is critical to the resulting flavor of the brew produced by the system of the present invention.

Coffee Blend and Grind:

A proprietary blend of coffees that are then inserted into an percolation filter housing.

Percolation:

Once the conditioned water is introduced to the ground coffee, the resulting 'brewed' coffee is forced back through the coffee grinds repeatedly using fluid pump.

The process of use of the present invention, as depicted in FIG. 1, is preferably as follows:
1. Water is filtered. The water is kept cold. (100)
2. A proprietary blend of coffees is ground. (110)
3. The ground coffee is placed within the filter. (120)
4. The conditioned water is introduced to the ground coffee. (130)
5. The resulting coffee liquid is then forced back through the ground coffee within the filter using a fluid pump. (140)
6. After the coffee liquid is pumped back and forth through the percolation filter housing, the coffee liquid is ready for consumption. (150)

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:
1. A method of cold-brewing espresso comprising:
   filtering water via reverse osmosis;
   conditioning the water with minerals and salts, stabilizing the water;
   grinding a blend of coffee beans to a fine espresso ground;
   disposing the fine espresso ground in an in-line percolation filter housing;
   connecting a water pump to the in-line percolation filter housing;

pumping water through the in-line percolation filter housing, introducing the fine espresso ground to the water producing coffee;
pumping the coffee back through the in-line percolation filter housing; and
cold-brewed espresso emerging from the in-line percolation filter housing.

2. The method of claim 1, wherein the in-line percolation filter housing houses a filter.

3. The method of claim 1, wherein grinds of the fine espresso ground is approximately 80 microns.

* * * * *